(12) United States Patent
Lin et al.

(10) Patent No.: US 9,959,896 B1
(45) Date of Patent: May 1, 2018

(54) OPTICAL DISC DRIVE

(71) Applicant: LITE-ON TECHNOLOGY CORPORATION, Taipei (TW)

(72) Inventors: Che-Ching Lin, Taipei (TW); Chia-Hao Hsu, Taipei (TW)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 0 days. days.

(21) Appl. No.: 15/696,286

(22) Filed: Sep. 6, 2017

(30) Foreign Application Priority Data

Jun. 9, 2017 (CN) .......................... 2017 1 0432898

(51) Int. Cl.
*G11B 7/00* (2006.01)
*G11B 7/085* (2006.01)
*G11B 19/20* (2006.01)

(52) U.S. Cl.
CPC ...... *G11B 7/08582* (2013.01); *G11B 19/2009* (2013.01)

(58) Field of Classification Search
None
See application file for complete search history.

(56) References Cited

U.S. PATENT DOCUMENTS

| | | | | |
|---|---|---|---|---|
| 5,278,712 A * | 1/1994 | Sugaya | ................... | G11B 5/012 360/133 |
| 5,612,939 A * | 3/1997 | Ueki | ...................... | G11B 7/004 369/47.11 |
| 5,673,359 A * | 9/1997 | Ohta | ...................... | G11B 19/24 386/206 |
| 2002/0136146 A1* | 9/2002 | Lee | ......................... | B82Y 10/00 369/112.23 |
| 2003/0021053 A1* | 1/2003 | Sakai | ..................... | G11B 5/012 360/67 |
| 2005/0132393 A1* | 6/2005 | Omori | .................... | G11B 7/082 720/669 |
| 2007/0041292 A1* | 2/2007 | Igi | ......................... | G11B 19/28 369/47.39 |
| 2008/0137509 A1* | 6/2008 | Omori | ................. | G11B 7/0037 369/94 |
| 2015/0092526 A1* | 4/2015 | Shimomai | .......... | G11B 7/24038 369/47.49 |

* cited by examiner

Primary Examiner — Peter Vincent Agustin
(74) Attorney, Agent, or Firm — WPAT, PC

(57) ABSTRACT

An optical disc drive includes a spindle motor, a first control module and a second control module. The spindle motor includes a turn table for supporting and rotating an optical disc. The first control module includes a first optical pickup head corresponding to a first data layer of the optical disc. The first control module is connected with a host through a first bus to execute a first control command. The second control module includes a second optical pickup head corresponding to a second data layer of the optical disc. The second control module is connected with the host through a second bus to execute a second control command. The first control module and the second control module communicate with each other according to a negotiation signal. Moreover, the spindle motor is operated at a target rotation speed under control of the first control module.

14 Claims, 4 Drawing Sheets

OPTICAL DISC DRIVE

This application claims the benefit of People's Republic of China Patent Application No. 201710432898.3, filed Jun. 9, 2017, the subject matter of which is incorporated herein by reference.

FIELD OF THE INVENTION

The present invention relates to an optical disc drive, and more particularly to an optical disc drive with two optical pickup heads.

BACKGROUND OF THE INVENTION

As known, an optical disc drive is used to read data from an optical disc or write data into the optical disc. For storing more data, an optical disc with plural data layers has been introduced into the market. For example, a double-sided optical disc comprises two data layers on a top side and a bottom side, respectively.

Generally, the optical disc drive has a single optical pickup head (PUH). For accessing the data of the first side of the double-sided optical disc, the optical disc is loaded into the optical disc drive. When the optical disc is loaded into the optical disc drive, the first side of the optical disc faces the optical pickup head. Consequently, the laser beam emitted by the optical pickup head is focused on the data layer of the first side of the optical disc so as to access the data.

For accessing the data of the second side of the double-sided optical disc, the optical disc is ejected from the optical disc drive. After the optical disc is turned over, the optical disc is loaded into the optical disc drive again, wherein the second side of the optical disc faces the optical pickup head. Consequently, the laser beam emitted by the optical pickup head is focused on the data layer of the second side of the optical disc so as to access the data.

SUMMARY OF THE INVENTION

The present invention provides an optical disc drive with two control modules. Each control module comprises an optical pickup head. Through a negotiation signal, the two control modules of the optical disc drive can simultaneously control the two optical pickup heads to access the two data layers of a double-sided optical disc. Consequently, the data of the double-sided optical disc can be accessed quickly.

An embodiment of the present invention provides an optical disc drive. The optical disc drive is connected with a host. A double-sided optical disc is loaded into the optical disc drive. The optical disc drive includes a spindle motor, a first control module and a second control module. The spindle motor includes a turn table for supporting and rotating the optical disc. The first control module includes a first optical pickup head corresponding to a first data layer of the optical disc. The first control module is connected with the host through a first bus. The first control module executes a first control command from the host. The second control module includes a second optical pickup head corresponding to a second data layer of the optical disc. The second control module is connected with the host through a second bus. The second control module executes a second control command from the host. The first control module and the second control module communicate with each other according to a negotiation signal. Moreover, the spindle motor is operated at a target rotation speed under control of the first control module.

An embodiment of the present invention provides an optical disc drive. The optical disc drive is connected with a host. A double-sided optical disc is loaded into the optical disc drive. The optical disc drive comprises: a first control module comprising a first optical pickup head corresponding to a first data layer of the optical disc; a second control module comprising a second optical pickup head corresponding to a second data layer of the optical disc; wherein the first control module and the second control module communicate with each other according to a negotiation signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
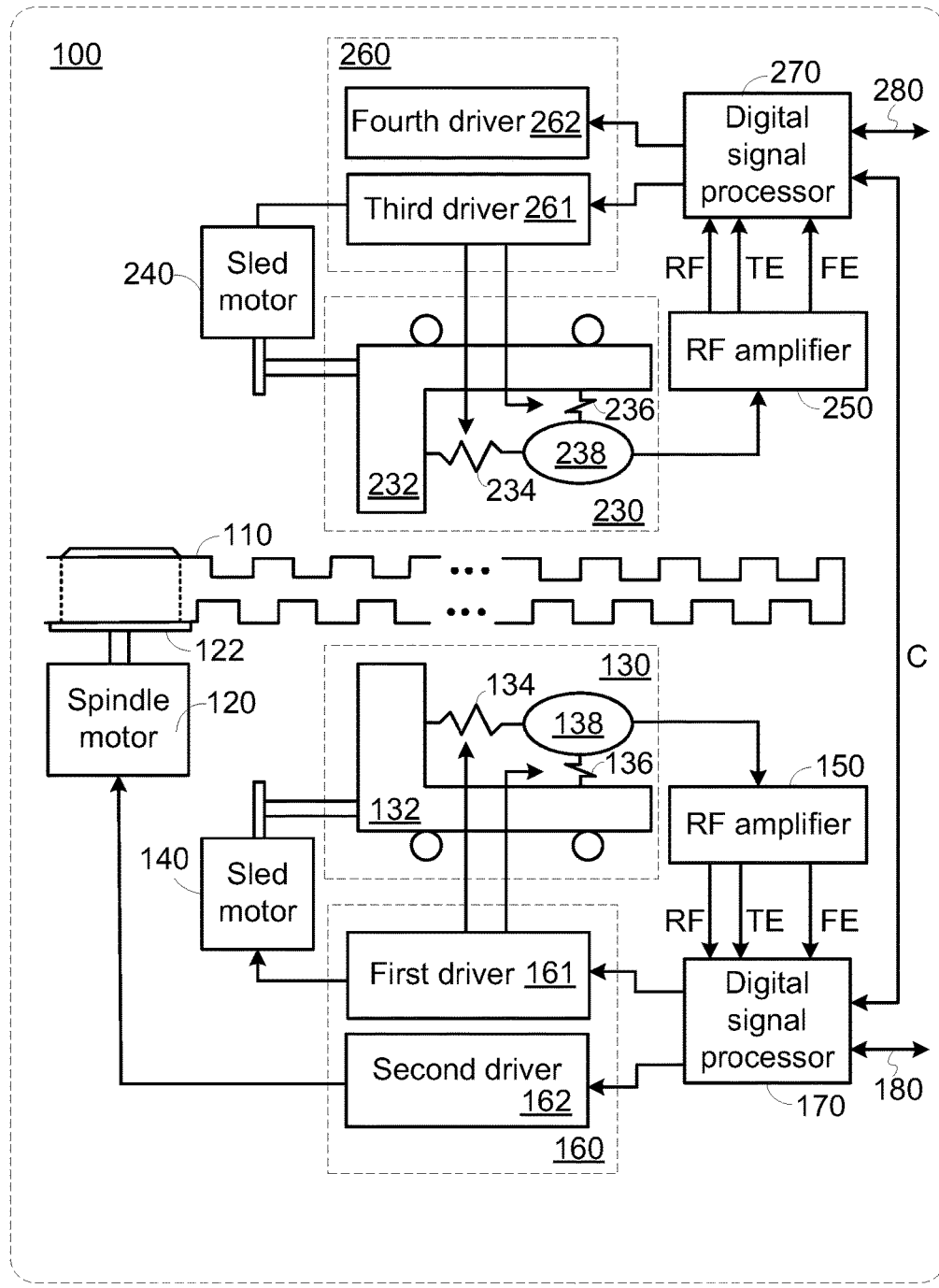
FIG. 1 is a schematic functional block diagram illustrating the architecture of an optical disc drive according to an embodiment of the present invention.

FIG. 1 is a schematic functional block diagram illustrating the architecture of an optical disc drive according to an embodiment of the present invention. The optical disc drive 100 comprises a spindle motor 120. The spindle motor 120 comprises a turn table 122. Moreover, an optical disc 110 having a center hole is placed on a turn table 122. The spindle motor 120 is used for driving rotation of the turn table 122 and the optical disc 110. In this embodiment, the optical disc 110 is a double-sided optical disc.

The optical disc drive 100 comprises two control modules. The first control module is used for accessing the data of a first side of the optical disc 110. The second control module is used for accessing the data of a second side of the optical disc 110. For example, the first control module comprises an optical pickup head 130, a sled motor 140, a radio frequency (RF) amplifier 150, a driving circuit 160 and a digital signal processor 170.

A sled 132 of the optical pickup head 130 comprises a tracking coil 134 and a focusing coil 136. The tracking coil 134 is used for driving a tiny movement of a lens 138 in a radial direction. The focusing coil 136 is used for driving a tiny movement of the lens 138 in a focusing direction. The sled motor 140 is used for driving a long-distance movement of the sled 132 in the radial direction.

When the optical pickup head 130 accesses the optical disc 110, a weak electronic signal is generated and transmitted to the RF amplifier 150. By the RF amplifier 150, the electronic signal is processed into a radio frequency signal RF, a tracking error signal TE, a focusing error signal FE and other output signals. These output signals are further processed and employed by the back-end digital signal processor 170.

According to the changes of the tracking error signal TE and the focusing error signal FE, the digital signal processor 170 controls a first driver 161 of the driving circuit 160 to generate three driving signals for respectively driving the sled motor 130, the tracking coil 134 and the focusing coil 136. Consequently, the optical head 130 is located at the proper focusing position and moved to the desired track along the radial direction of the optical disc 110.

The lens 138 is movable upwardly or downwardly relative to the sled 132 within a movable range. When the optical disc 110 is loaded into the optical disc drive 100, the digital signal processor 170 controls the focusing operation of the first driver 161 according to the focusing error signal FE. While the focusing operation is performed, the focusing coil 136 is driven to concentrate the focus of the lens 138 on the data layer of the first side of the optical disc 110 and then a close-loop control mechanism is implemented according to the focusing error signal FE. Consequently, the focus of the lens 138 is stably located on the data layer of the optical disc 110.

Moreover, under the control of the digital signal processor 170, a second driver 162 of the driving circuit 160 output a driving signal for driving the spindle motor 120 to generate a proper driving force. Consequently, the optical disc 110 is rotated at a proper operating speed.

After the focus of the lens 138 is stably located on the data layer of the optical disc 110, the optical disc drive 100 controls the optical pickup head 130 to jump to the target track to read data. When the lens 138 is moved to a position near the target track, the optical disc drive 100 performs a tracking-on operation. While the tracking-on operation is performed, a close-loop control mechanism is implemented according to the tracking error signal TE. Consequently, the focus of the lens 138 is stably located on the target track of the optical disc 110. Then, the optical disc drive 100 accesses the data of the optical disc 110.

The second control module of the optical disc drive 100 comprises an optical pickup head 230, a sled motor 240, a RF amplifier 250, a driving circuit 260 and a digital signal processor 270. The optical pickup head 230 comprises a sled 232, a tracking coil 234, a focusing coil 236 and a lens 238. The driving circuit 260 comprises a third driver 261 and a fourth driver 262. In comparison with the first control module, the fourth driver 262 of the second control module is not connected with the spindle motor 120. The operations of the other components of the second control module are similar to those of the first control module, and are not redundantly described herein. In some embodiment, the driving circuit 260 of the second control module is not equipped with the fourth driver 262. Under this circumstance, the digital signal processor 270 does not provide signals to the fourth driver 262.

The digital signal processor 170 of the first control module and the digital signal processor 270 of the second control module are connected with an external host (not shown) through respective buses 180 and 280. That is, the host is connected with the buses 180 and 280 of the optical disc drive 100. Consequently, the host can recognize the presence of two optical disc drives. Moreover, the host issues respective control commands through the buses 180 and 280 in order to access the data of two opposed sides of the same optical disc 110.

As mentioned above, the two control modules are included in the housing of one optical disc drive and connected with the external host through the buses 180 and 280. Consequently, the host can recognize the presence of two optical disc drives but there is only one optical disc drive physically exists. After the host recognizes that the host is connected with two optical disc drives, the host issues respective control commands through the buses 180 and 280 in order to access the data of two opposed sides of the same optical disc 110. That is, the host issues a control command through the bus 180 to access the data of the first side of the optical disc 110, and the host issues another control command through the bus 280 to access the data of the second side of the optical disc 110.

In accordance with a feature of the present invention, the spindle motor 120 of the optical disc drive 100 is controlled by one of the two control modules. In the embodiment of FIG. 1, the spindle motor 120 is controlled by the second driver 162 of the driving circuit 160 of the first control module.

Moreover, the digital signal processor 170 of the first control module and the digital signal processor 270 of the second control module communicate and coordinate with each other through a negotiation signal C.

In case that the optical disc 110 is a single-sided optical disc and the data layer faces the optical pickup head 130 of the first control module, the first control module is enabled and the second control module is disabled according to the negotiation signal C. Meanwhile, the first control module receives and executes the control command from the host through the bus 180.

In case that the optical disc 110 is a single-sided optical disc and the data layer faces the optical pickup head 230 of the second control module, the second control module is enabled according to the negotiation signal C and the second control module instructs the first control module to control the spindle motor 120. Meanwhile, the second control module receives and executes the control command from the host through the bus 280. Moreover, the second control module issues a rotation speed command to the first control module through the negotiation signal C. According to the rotation speed command, the first control module controls the spindle motor 120. Consequently, the rotation speed of the optical disc 110 complies with the requirements of the second control module.

In case that the optical disc 110 is a double-sided optical disc and the data layers of the first and second sides of the optical disc 110 face the optical pickup heads 130 and 230, respectively, the first control module and the second control module are enabled according to the negotiation signal C. Meanwhile, the first control module receives and executes the control command from the host through the bus 180, and the second control module receives and executes the control command from the host through the bus 280. Moreover, the first control module and the second control module confirm the rotation speed of the optical disc 110 according to the negotiation signal C.

Figure 2A:
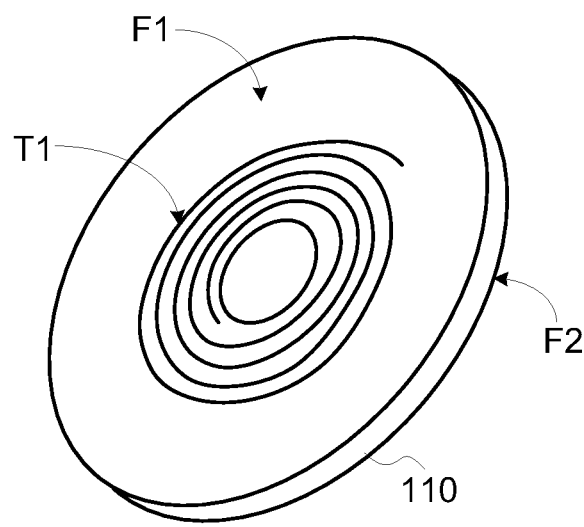
FIGS. 2A and 2B are schematic perspective views illustrating a double-sided optical disc applied to the optical disc drive according to an embodiment of the present invention.
Figure 2B:
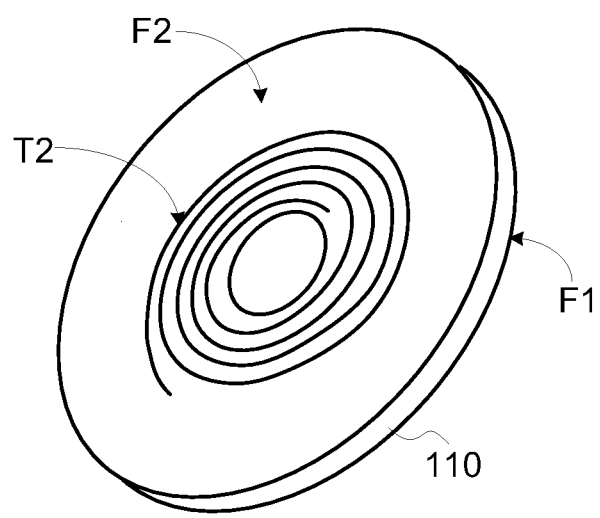

FIGS. 2A and 2B are schematic perspective views illustrating a double-sided optical disc applied to the optical disc drive according to an embodiment of the present invention.

The double-sided optical disc 110 has a first data side F1 and a second data side F2. The first data side F1 has a first spiral track T1. The second data side F2 has a second spiral track T2. The spiral direction of the first spiral track T1 and the spiral direction of the second spiral track T2 are opposite. In this embodiment, the spiral direction of the first spiral track T1 of the first data side F1 is clockwise, and the spiral direction of the second spiral track T2 of the second data side F2 is counterclockwise.

After the first control module and the second control module confirm the rotation speed of the optical disc 110 according to the negotiation signal C, the second driver 162 of the driving circuit 160 of the first control module controls the rotation of the spindle motor 120. Consequently, the optical pickup head 130 of the first control module and the optical pickup head 230 of the second control module access the data of the first data side F1 and the second data side F2 simultaneously.

For example, if the first control module intends to rotate the optical disc 110 at a first rotation speed (e.g., 16 times speed) and the second control module intends to rotate the optical disc 110 at a second rotation speed (e.g., 32 times speed), one of the first rotation speed and the second rotation speed is selected as a target rotation speed according to the negotiation signal C. For example, if the higher rotation speed (e.g., the second rotation speed) is selected as the target rotation speed, the first control module controls the spindle motor 120 to rotate the optical disc 110 at the second rotation speed. Meanwhile, the data accessing rate of the second control module is as high as the data accessing rate of the first control module. Moreover, the first control module adjusts the accessing operation on the first data side of the optical disc 110 according to the second rotation speed.

In a special situation, the first control module is restrainedly allowed to rotate the optical disc 110 at the lowest rotation speed (e.g., 1 times speed) and the second control module intends to rotate the optical disc 110 at a second rotation speed (e.g., 32 times speed). According to the negotiation signal C, the first control module controls the spindle motor 120 to rotate the optical disc 110 at the lowest rotation speed (i.e., the first rotation speed). Meanwhile, the data accessing rate of the second control module is as high as the data accessing rate of the first control module. Moreover, the second control module adjusts the accessing operation on the second data side of the optical disc 110 according to the lowest rotation speed.

Figure 3C:
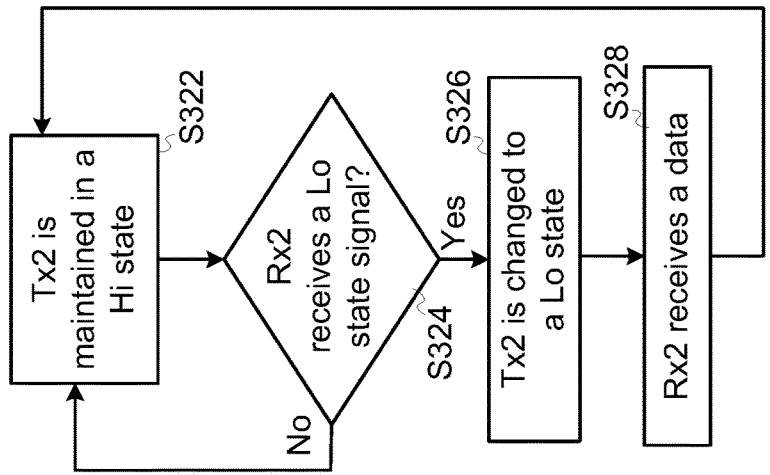
FIG. 3C is a flowchart illustrating a method of receiving data by the digital signal processor of the second control module.
Figure 3B:
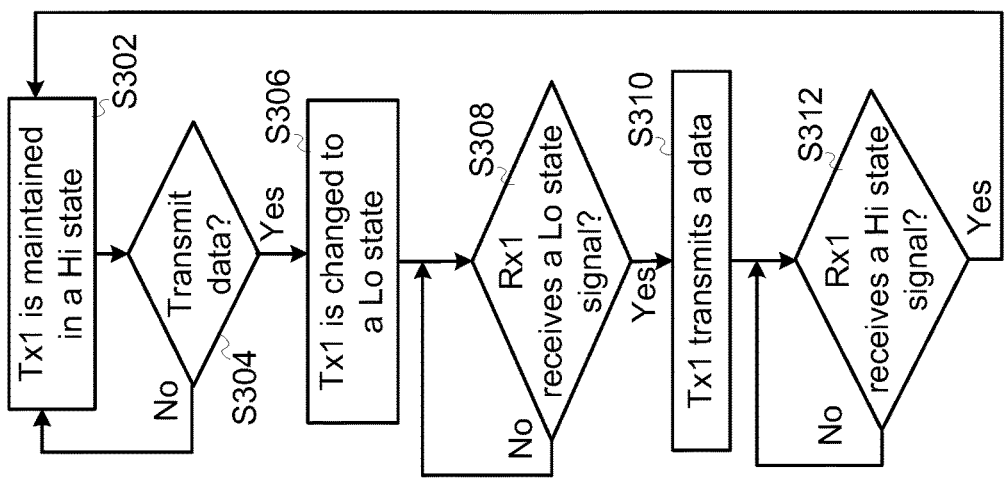
FIG. 3B is a flowchart illustrating a method of outputting data from the digital signal processor of the first control module.
Figure 3A:
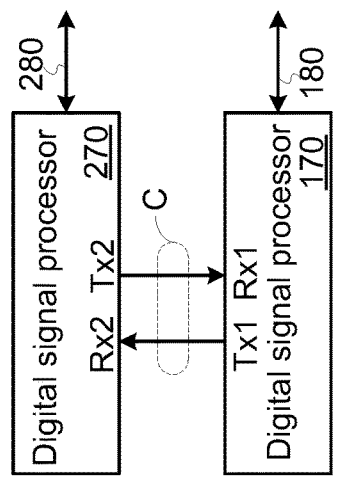
FIG. 3A is a schematic circuit diagram illustrating the associated circuits for generating the negotiation signal.

FIG. 3A is a schematic circuit diagram illustrating the associated circuits for generating the negotiation signal. As shown in FIG. 3A, the digital signal processor 170 of the first control module has a transmitter terminal Tx1 and a receiver terminal Rx1, and the digital signal processor 270 of the second control module has a transmitter terminal Tx2 and a receiver terminal Rx2. The transmitter terminal Tx1 is connected with the receiver terminal Rx2. The transmitter terminal Tx2 is connected with the receiver terminal Rx1. The signal from the transmitter terminal Tx1 and the signal from the transmitter terminal Tx2 are combined as the negotiation signal C. In an embodiment, the transmitter terminals Tx1, Tx2 and the receiver terminals Rx1, Rx2 are general purpose I/O pins of the digital signal processors 170 and 270.

FIG. 3B is a flowchart illustrating a method of outputting data from the digital signal processor 170. FIG. 3C is a flowchart illustrating a method of receiving data by the digital signal processor 270.

Please refer to FIG. 3B. When no data is transmitted or received, the transmitter terminal Tx1 of the digital signal processor 170 is maintained in a high level state "Hi" (Step S302).

If the digital signal processor 170 intends to transmit data (Step S304), the digital signal processor 170 changes the voltage level of the transmitter terminal Tx1 to a low level state "Lo" (Step S306). The signal in the low level state "Lo" is transmitted from the transmitter terminal Tx1 to the receiver terminal Rx2 of the digital signal processor 270 in order to notify the digital signal processor 270 to receive the data from the digital signal processor 170.

Moreover, if the receiver terminal Rx1 of the digital signal processor 170 receives a signal in the low level state "Lo" (Step S308), it means that the digital signal processor 270 is ready to receive data. Then, the transmitter terminal Tx1 of the digital signal processor 170 starts to output a data (Step S310). In this context, a data contains a fixed number of bits. For example, each data is an 8-bit data.

If the receiver terminal Rx1 of the digital signal processor 170 receives a signal in the high level state "Hi" (Step S312), it means that the digital signal processor 270 has received the data. Meanwhile, the process of transmitting a data from the digital signal processor 170 is completed, and the transmitter terminal Tx1 of the digital signal processor 170 is changed to the high level state "Hi". Then, the step S302 is repeatedly done to see if need to transmit next data.

Please refer to FIG. 3C. When no data is transmitted or received, the transmitter terminal Tx2 of the digital signal processor 270 is maintained in a high level state "Hi" (Step S322).

Moreover, if the receiver terminal Rx2 of the digital signal processor 270 receives a signal in a low level state "Lo" (Step S324), it means that the digital signal processor 170 is ready to output data. Then, the digital signal processor 270 changes the voltage level of the transmitter terminal Tx2 to a low level state "Lo" (Step S326). The signal in the low level state "Lo" is transmitted from the transmitter terminal Tx2 to the receiver terminal Rx1 of the digital signal processor 170 in order to notify the digital signal processor 170 to output data.

Then, the receiver terminal Rx2 of the digital signal processor 270 starts to receive a data (Step S328). When the process of receiving a data by the digital signal processor 270 is completed, the transmitter terminal Tx2 of the digital signal processor 270 is changed to the high level state "Hi". Then, the step S322 is repeatedly done to see if need to receive next data.

The flowcharts of FIGS. 3B and 3C denote the process of transmitting data from the digital signal processor 170 to the digital signal processor 270. The process of transmitting data from the digital signal processor 270 to the digital signal processor 170 is similar. In other words, the digital signal processor 170 and the digital signal processor 270 can exchange between each other. The data to be transmitted between the digital signal processors 170 and 270 are control commands.

Figure 3D:
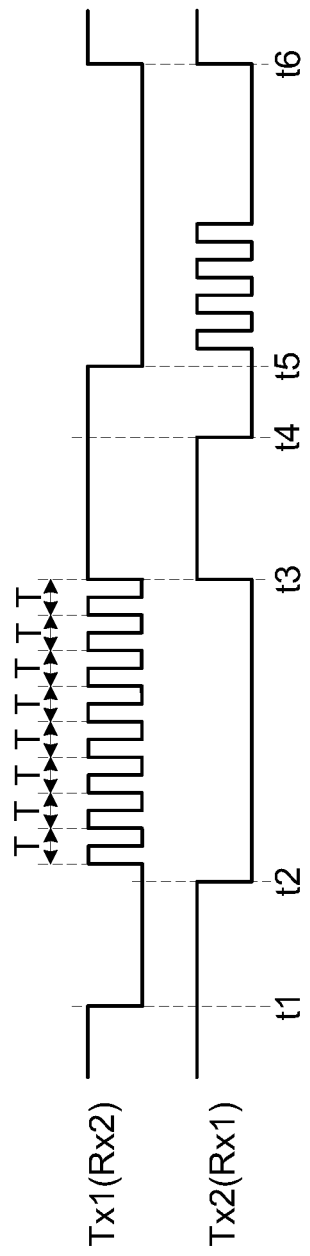
FIG. 3D is a schematic timing waveform diagram illustrating the process of transmitting data between the digital signal processor of the first control module and the digital signal processor of the second control module according to the negotiation signal.

FIG. 3D is a schematic timing waveform diagram illustrating the process of transmitting data between the digital signal processor of the first control module and the digital signal processor of the second control module according to the negotiation signal.

Before the time point t1, the transmitter terminal Tx1 of the digital signal processor 170 and the transmitter terminal Tx2 of the digital signal processor 270 are maintained in the high level state "Hi". Meanwhile, no data is transmitted or received.

At the time point t1, the digital signal processor 170 intends to transmit data. Consequently, the voltage level of the transmitter terminal Tx1 of the digital signal processor 170 is changed to the low level state "Lo", and the signal in the low level state "Lo" is transmitted from the transmitter terminal Tx1 to the receiver terminal Rx2 of the digital signal processor 270.

At the time point t2, the voltage level of the transmitter terminal Tx2 of the digital signal processor 270 is changed to the low level state "Lo". Moreover, the signal in the low level state "Lo" is transmitted from the transmitter terminal Tx2 to the receiver terminal Rx1 of the digital signal processor 170 in order to notify the digital signal processor 170 to output data. Then, the transmitter terminal Tx1 of the digital signal processor 170 starts to output a data to the receiver terminal Rx2 of the digital signal processor 270.

As shown in FIG. 3D, the digital signal processor 170 outputs a bit per cycle T. After 8 cycles, an eight-bit data "11111111" is outputted.

At the time point t3, the digital signal processor 270 has received one data. Meanwhile, the transmitter terminal Tx2 of the digital signal processor 270 is changed to the high level state "Hi", and the signal in the high level state "Hi" is transmitted to the receiver terminal Rx1 of the digital signal processor 170. After the signal in the high level state "Hi" is received by the receiver terminal Rx1 of the digital signal processor 170, the transmitter terminal Tx1 of the digital signal processor 170 is changed to the high level state "Hi". Meanwhile, the process of transmitting the data from the digital signal processor 170 is completed.

At the time point t4, the digital signal processor 270 intends to transmit data. Consequently, the voltage level of the transmitter terminal Tx2 of the digital signal processor 270 is changed to the low level state "Lo", and the signal in the low level state "Lo" is transmitted from the transmitter terminal Tx2 to the receiver terminal Rx1 of the digital signal processor 170.

At the time point t5, the voltage level of the transmitter terminal Tx1 of the digital signal processor 170 is changed to the low level state "Lo". Moreover, the signal in the low level state "Lo" is transmitted from the transmitter terminal Tx1 to the receiver terminal Rx2 of the digital signal processor 270 in order to notify the digital signal processor 270 to output data. Then, the transmitter terminal Tx2 of the digital signal processor 270 starts to output a data (e.g., "11110000") to the receiver terminal Rx1 of the digital signal processor 170.

At the time point t6, the digital signal processor 170 has received one data. Meanwhile, the transmitter terminal Tx1 of the digital signal processor 170 is changed to the high level state "Hi", and the signal in the high level state "Hi" is transmitted to the receiver terminal Rx2 of the digital signal processor 270. After the signal in the high level state "Hi" is received by the receiver terminal Rx2 of the digital signal processor 270, the transmitter terminal Tx2 of the digital signal processor 270 is changed to the high level state "Hi". Meanwhile, the process of transmitting the data from the digital signal processor 270 is completed.

Moreover, the communication protocol of the negotiation signal C between the digital signal processor 170 and the digital signal processor 270 is not restricted. For example, the communication protocol may be self-defined by the person skilled in the art.

From the above descriptions, the present invention provides an optical disc drive comprising two control modules. Each control module comprises an optical pickup head. In the single optical disc drive, the two control modules control the two optical pickup heads to simultaneously access two data layers of a double-sided optical disc through a negotiation signal. Consequently, the double-sided optical disc can be accessed quickly according to the control commands from the host.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical disc drive connected with a host, a double-sided optical disc is loadable into the optical disc drive, the optical disc drive comprising:
    a spindle motor comprising a turn table for supporting and rotating the optical disc;
    a first control module comprising a first optical pickup head corresponding to a first data layer of the optical disc, wherein the first control module comprises a first digital signal processor connected with the host through a first bus, and the first control module executes a first control command from the host; and
    a second control module comprising a second optical pickup head corresponding to a second data layer of the optical disc, wherein the second control module comprises a second digital signal processor connected with the host through a second bus, and the second control module executes a second control command from the host;
    wherein the first control module and the second control module communicate with each other according to a negotiation signal, and the spindle motor is operated at a target rotation speed under control of the first control module.

2. The optical disc drive as claimed in claim 1, wherein the first control module comprises:
    a first driving circuit connected with the spindle motor and the first digital signal processor, wherein the first digital signal processor controls the first driving circuit to adjust a rotation speed of the spindle motor; and
    a first sled motor connected with the first driving circuit, wherein the first optical pickup head is connected with the first sled motor and the first driving circuit, and the first digital signal processor controls the first driving circuit to drive the first optical pickup head.

3. The optical disc drive as claimed in claim 2, wherein the second control module comprises:
    a second driving circuit connected with the second digital signal processor; and
    a second sled motor connected with the second driving circuit,
    wherein the second optical pickup head is connected with the second sled motor and the second driving circuit, and the second digital signal processor controls the second driving circuit to drive the second optical pickup head.

4. The optical disc drive as claimed in claim 1, wherein the first digital signal processor comprises a first transmitter terminal and a first receiver terminal, and the second digital signal processor comprises a second transmitter terminal and a second receiver terminal, wherein the first transmitter terminal is connected with the second receiver terminal, the second transmitter terminal is connected with the first receiver terminal, and a signal from the first transmitter terminal and a signal from the second transmitter terminal are combined as the negotiation signal.

5. The optical disc drive as claimed in claim 1, wherein the first digital signal processor controls a first driving circuit to adjust a rotation speed of the spindle motor, wherein the first digital signal processor comprises a first transmitter terminal and a first receiver terminal, and the second digital signal processor comprises a second transmitter terminal and a second receiver terminal, wherein the first transmitter terminal is connected with the second receiver terminal, the second transmitter terminal is connected with the first receiver terminal, and a signal from the first transmitter terminal and a signal from the second transmitter terminal are combined as the negotiation signal.

6. The optical disc drive as claimed in claim 5, wherein if a data is not transmitted from or received by the first digital signal processor, the first transmitter terminal is maintained in a first level state, wherein if the first digital signal processor intends to transmit the data to the second digital signal processor, the first transmitter terminal is changed to a second level state, wherein the second level state is different from the first level state.

7. The optical disc drive as claimed in claim 5, wherein if a data is not transmitted from or received by the first digital signal processor, the first transmitter terminal is maintained in a first level state, wherein if the first digital signal processor intends to receive the data from the second digital signal processor, the first transmitter terminal is changed to a second level state after the first receiver terminal is changed to the second level state, wherein the second level state is different from the first level state.

8. The optical disc drive as claimed in claim 7, wherein the data contains a fixed number of bits, and the first digital signal processor recognizes a received bit number according to elapsed time, wherein if the first digital signal processor judges that the received bit number reaches the fixed number, the first transmitter terminal is changed from the second level state to the first level state.

9. The optical disc drive as claimed in claim 1, wherein the first control module controls the first optical pickup head to access a data of the first data layer of the optical disc according to the first control command, and the second control module controls the second optical pickup head to access a data of the second data layer of the optical disc according to the second control command.

10. An optical disc drive connected with a host, a double-sided optical disc is loadable into the optical disc drive, the optical disc drive comprising:
a spindle motor comprising a turn table for supporting and rotating the optical disc;
a first control module comprising a first optical pickup head corresponding to a first data layer of the optical disc; and
a second control module comprising a second optical pickup head corresponding to a second data layer of the optical disc;
wherein the first control module and the second control module communicate with each other according to a negotiation signal, and the spindle motor is operated at a target rotation speed under control of the first control module,
wherein the second control module instructs the first control module to control the spindle motor to be operated at the target rotation speed according to the negotiation signal.

11. An optical disc drive connected with a host, a double-sided optical disc is loadable into the optical disc drive, the optical disc drive comprising:
a first control module comprising a first optical pickup head corresponding to a first data layer of the optical disc;
a second control module comprising a second optical pickup head corresponding to a second data layer of the optical disc;
wherein the first control module and the second control module communicate with each other according to a negotiation signal,
wherein the first control module comprises a first digital signal processor having a first transmitter terminal and a first receiver terminal, and the second control module comprises a second digital signal processor having a second transmitter terminal and a second receiver terminal, wherein the first transmitter terminal is connected with the second receiver terminal, the second transmitter terminal is connected with the first receiver terminal, and a signal from the first transmitter terminal and a signal from the second transmitter terminal are combined as the negotiation signal.

12. The optical disc drive as claimed in claim 11, wherein if a data is not transmitted from or received by the first digital signal processor, the first transmitter terminal is maintained in a first level state, wherein if the first digital signal processor intends to transmit the data to the second digital signal processor, the first transmitter terminal is changed to a second level state, wherein the second level state is different from the first level state.

13. The optical disc drive as claimed in claim 11, wherein if a data is not transmitted from or received by the first digital signal processor, the first transmitter terminal is maintained in a first level state, wherein if the first digital signal processor intends to receive the data from the second digital signal processor, the first transmitter terminal is changed to a second level state after the first receiver terminal is changed to the second level state, wherein the second level state is different from the first level state.

14. The optical disc drive as claimed in claim 13, wherein the data contains a fixed number of bits, and the first digital signal processor recognizes a received bit number according to elapsed time, wherein if the first digital signal processor judges that the received bit number reaches the fixed number, the first transmitter terminal is changed from the second level state to the first level state.

\* \* \* \* \*